Sept. 2, 1930.　　　O. ADDOR　　　1,774,957
VEHICLE LAMP
Filed July 30, 1928　　　4 Sheets-Sheet 1
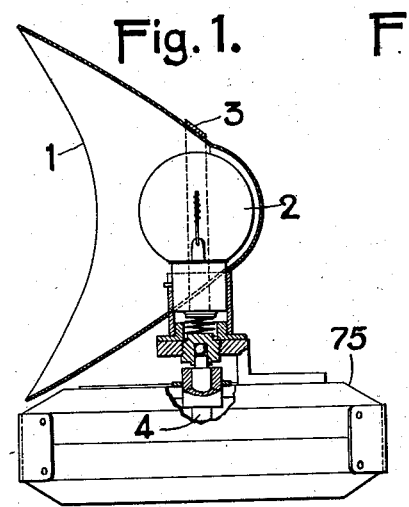
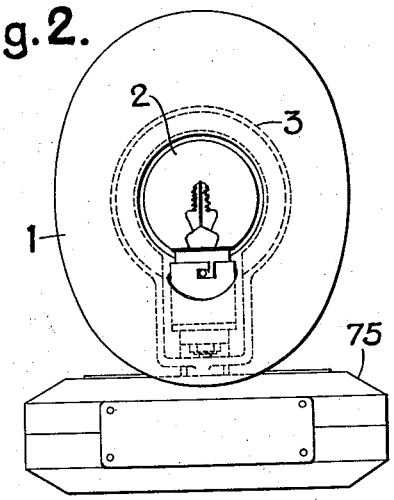
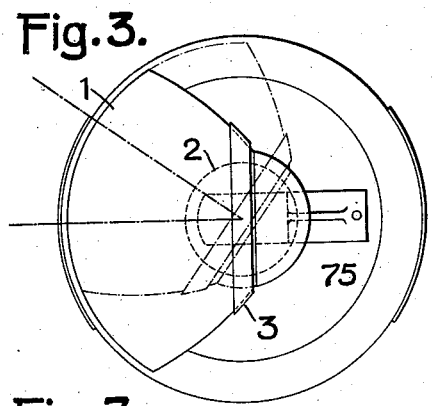
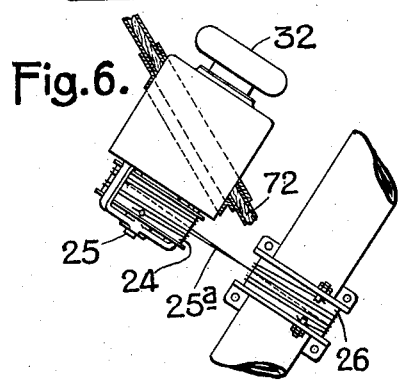
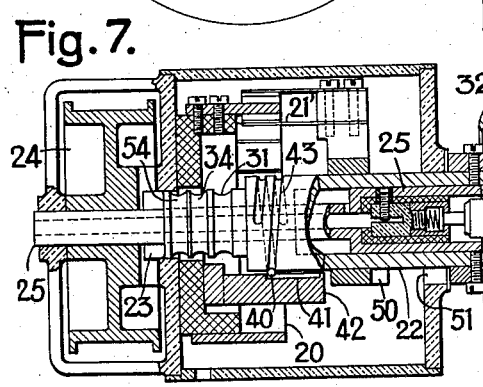
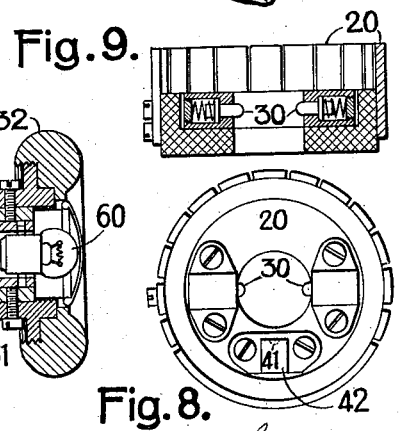

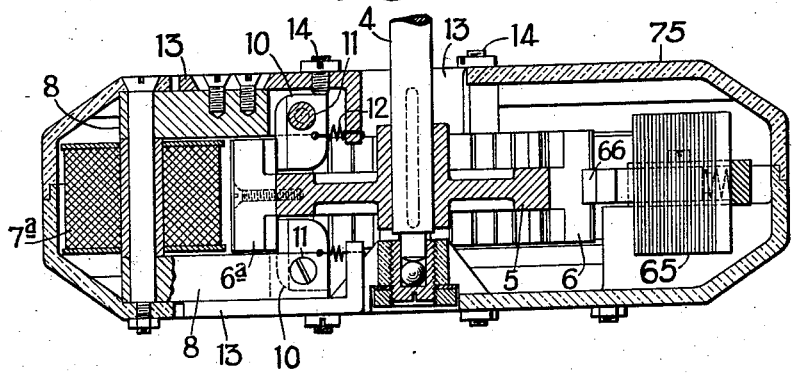

Sept. 2, 1930.                O. ADDOR                1,774,957
                            VEHICLE LAMP
                    Filed July 30, 1928        4 Sheets-Sheet 3
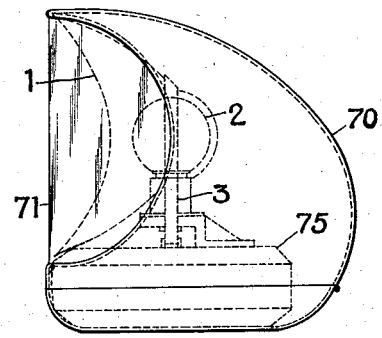
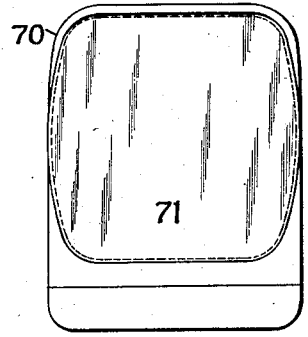
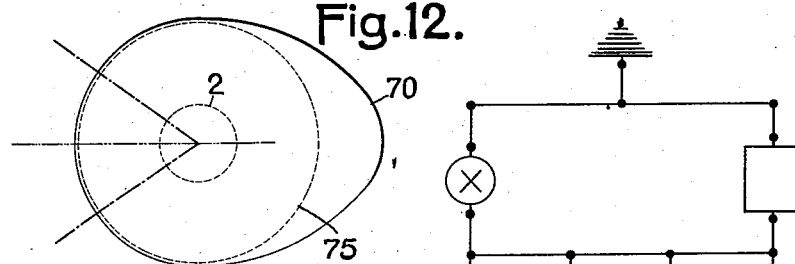
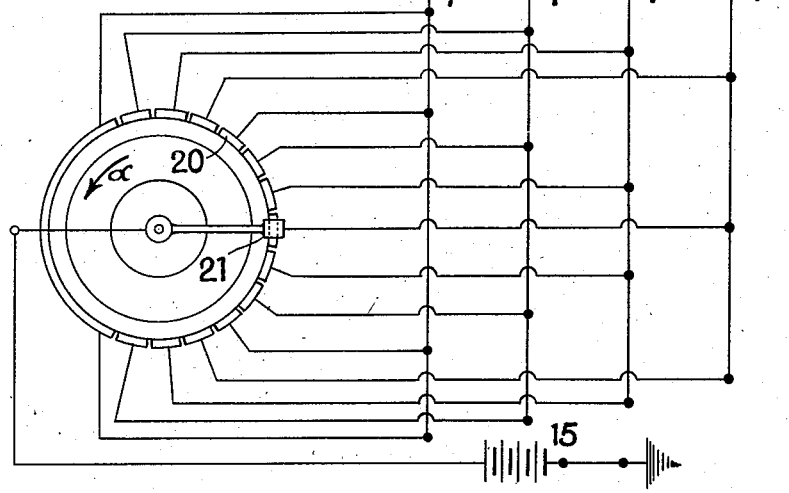

Sept. 2, 1930.    O. ADDOR    1,774,957
VEHICLE LAMP
Filed July 30, 1928    4 Sheets-Sheet 4
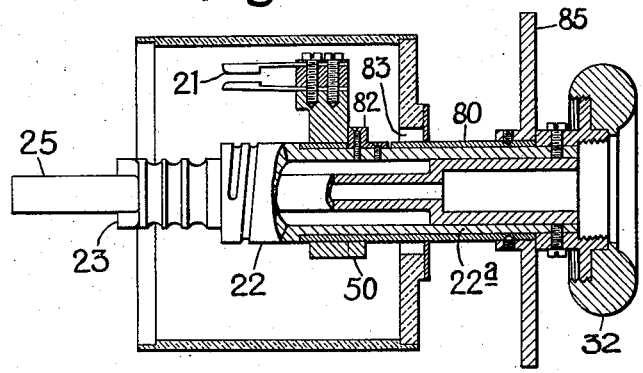
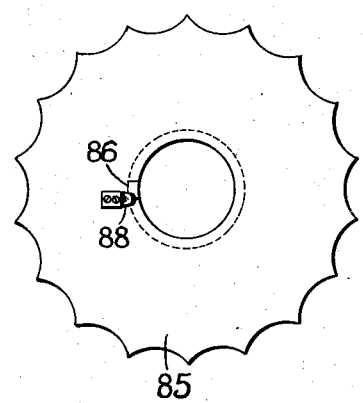
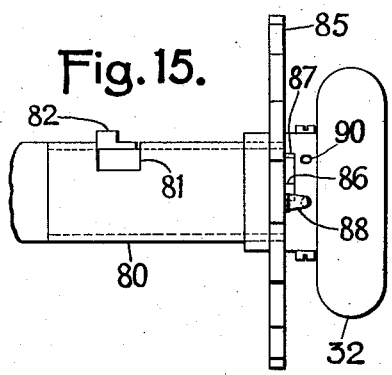
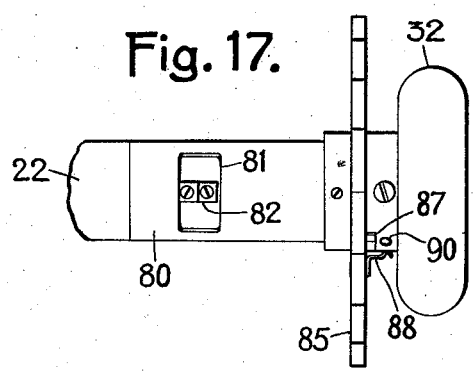

Patented Sept. 2, 1930

1,774,957

UNITED STATES PATENT OFFICE

OLIVIER ADDOR, OF LAUSANNE, SWITZERLAND

VEHICLE LAMP

Application filed July 30, 1928, Serial No. 296,214, and in Switzerland August 5, 1927.

The present invention relates to vehicle lamps in which the light beam can be swivelled sideways.

In lamps for motor vehicles it has been found a great disadvantage for the beam of the lamp not to make a simultaneous change of direction with the steering of the vehicle at bends in the road. It has already been proposed to arrange either the whole lamp or its reflector only on a rotary frame and to connect it positively to the steering rod or to the steering wheels so that they may participate in the turning movement of the same in the steering direction.

The present invention relates to an apparatus for lamps with reflectors turnable by the steering mechanism of the vehicle, in which the adjustment of the reflector into the respective direction of motion is effected by an armature situated on the rotary axis of the reflector and having a relatively great number of radial poles and a relatively small number of electromagnets which are connected in an exciting circuit by the vehicle steering mechanism, wherein the number of the armature poles is a multiple not divisible without remainder by the number of the electromagnets.

By this apparatus an extraordinarily accurate adjustment of the lamp reflector as well as a stabilization of the same in its different positions is obtained. Moreover this stabilization has the important advantage that vibrations, etc., have no effect on the adjustment of the reflector.

The accompanying drawings show a constructional example according to the invention.

Figure 1 is a side view partly in section of the reflector of a motor vehicle headlight with the electromagnetic operating means.

Figure 2 is a front view and

Figure 3 a plan view of the same.

Figure 4 is a vertical section on a larger scale through the electromagnetic operating means, and Figure 5 is a horizontal section of the same.

Figure 6 shows the connection of a commutator and contact device for controlling the electromagnetic drive from the vehicle steering.

Figure 7 is a longitudinal section through the commutator and contact device.

Figures 8 and 9 show in plan view and in section a segment ring of the same which cooperates with a movable control contact.

Figures 10, 11 and 12 show in side, front and plan view the outside of the lamp casing with its glass in.

Figure 13 is a wiring diagram for the commutator controlled circuit.

Figures 14, 15, 16 and 17 represent a modification relating to blinding means arranged to allow crossing of another vehicle without dazzling the conductor and without affecting automaticity of the mechanism.

The reflector 1 (Figures 1–3) of a motor vehicle headlamp, whose light source 2 is arranged stationarily in the focus of the reflector, is made rotatable about a vertical axis by being held in a ring 3 (Figure 2) which is fastened below to a vertical rotary shaft 4.

The shaft 4 which is mounted top and bottom in ball bearings carries a wheel 5 (Figures 4 and 5) with numerous radially projecting armature poles 6 on its periphery disposed inside an annular group of a relatively small number of stationary electromagnets $7^a$, $7^b$, $7^c$, $7^d$. Four of the latter are provided, and they are set at angles of 90° to each other round the wheel 5. Each electromagnet consists of a U-shaped magnet core 8 between whose pole limbs the armature poles 6 can pass. The number of the armature poles 6 is a multiple plus one of the number of the electromagnets $7^a$, $7^b$, $7^c$, $7^d$. In this case for instance there are seventeen armature poles 6 arranged at equal distances one from the other. The purpose of this number and disposition of the poles 6 with respect to the number and disposition of the electromagnets is that if one of the armature poles, in Figure 5 the one indicated by $6^a$, is substantially in the axis of the magnetic field of one of the electromagnets, in Figure 5 the electromagnet $7^a$, the armature pole $6^e$ distanced apart from that $6^a$ by four pole divisions is in the range of the next succeeding electromagnet, but not quite in the axis of the same. If therefore by exciting the electromagnet $7^a$ the armature pole $6^a$ takes up its position in the field axis of the same and thereafter the electromagnet $7^b$ is excited whilst the excitation of the electromagnet $7^a$ is interrupted, the armature pole $6^e$ is attracted by the electromagnet $7^b$ into its field axis which causes a partial rotation of the armature pole wheel.

Upon this partial rotation taking place another armature pole of the wheel comes into the effective range of the electromagnet $7^c$ whose excitation causes a further partial rotation of the armature pole wheel and so on, so that in this way by successive excitation of the electromagnets the armature pole wheel is turned in steps and the lamp reflector 1 is turned sideways by the successive partial rotations.

Whilst being in the field axis position the armature poles 6 of the wheel are held by a kind of brake. Such a brake is provided on the core limbs of each electromagnet and consists of two pressure pawls 10 (Figure 4) turnable about fixed axes 11 and acted upon by springs 12. On polarization of the magnet cores the pawls 10 are attracted by the same and press against the rear end of the corresponding armature pole 6 to hold the same fast in the field axis position. When the excitation ceases the pawls 10 are returned by their springs 12. The latter are each carried on an adjustable angle piece 13 and their tension can be adjusted by moving the same, whilst screws 14 in the angle pieces 13 enable the angular position of the pawls 10 to be adjusted.

An electric source 15 serves to excite the electromagnets which, as can be seen from the wiring diagram shown in Figure 13, is connected to the four electromagnets $7^a$, $7^b$, $7^c$, $7^d$ through a commutator and contact mechanism. The commutator consists of a stationary ring of segments 20 whose contact segments are insulated from each other and are connected with the four electromagnets in the way shown in Figure 13.

Against the segment ring 20 is disposed a movable contact fork 21 (Figure 7). The latter is situated on a rotary hollow shaft 22 which at one end is coupled by a clutch 23 to a cord disc 24 which is free to turn on a hollow shaft 25. The cord disc 24 is connected by a cord $25^a$ (Figure 6) with a cord disc 26 fastened on the steering rod of the vehicle in such a way that by turning the vehicle steering rod the cord disc 24 is correspondingly turned with it and transfers its rotary motion through the hollow shaft 22 to the contact fork 21 which thus slides along the segment ring 20. Thus, according to the wiring diagram shown in Figure 13, the electromagnets $7^a$, $7^b$, $7^c$, $7^d$ are successively inserted into the circuit of the current source 15 and thereby excited, the exciting current for the electromagnet $7^a$ for example flowing from the battery 15, connected at one terminal to the mass, through the contact fork 21, the corresponding segment 20, the electromagnet $7^a$ and a two-branch auxiliary circuit back to the mass. If the contact fork 21 moves out of the position shown in Figure 13 in the direction of the arrow corresponding to the direction of the movement of the steering, then after the electromagnet $7^a$ the electromagnets $7^b$, $7^c$, $7^d$ and thereafter $7^a$ . . . $7^d$ again in the same order are excited if the steering is turned further in the same direction. The armature pole wheel is thus turned from the position shown in Figure 5 in the direction of the arrow because after the electromagnet $7^a$ the electromagnets $7^b$ and so on are excited. If this rotation of the contact fork 21 is reversed from a segment which is connected to the electromagnet $7^d$, then thereafter the electromagnet $7^c$ is excited in whose working field an armature pole is situated and the armature pole wheel is turned in the reverse direction.

The armature pole wheel and thereby the reflector attached to the same in this way is turned in a direction corresponding to the direction in which the steering rod is turned.

The steering rod is connected in known manner by a transmission mechanism to the steering wheels of the vehicle. Practical experience shows that when turning corners the lateral swivelling of the beam should not exactly follow the displacement of the front wheels but should proceed in advance of it to obtain an absolutely safe view of the bend of the road ahead. In the example shown, the arrangement and breadth of the commutator segments with respect to the initial point of the control movement (corresponding to motion in a straight line) and the distribution of the armature poles is such that if on turning the steering rod the steering wheels of the vehicle are turned about 1° 15′ from the straight position, the movable contact of the commutator has already passed on to the next segment and imparted a partial rotation of 2° 30′ to the armature pole wheel, and that after turning the steering wheels of the vehicle about 3° 45′ the movable contact has passed over to the second next segment and given the armature pole wheel a further partial rotation of 2° 30′, thus making 5° in all, and so forth, so that moving the movable contact of the commutator from one segment to the next produces an advanced movement of the armature pole wheel and the rotary lamp reflector, which is adapted to give a good vision of the bend of the road ahead.

Hitherto in the above part of this specification it has been assumed that lateral swivelling of the beam is effected automatically by turning the vehicle road wheels.

It should also however be possible to swivel the beam manually if desired. For this purpose the hollow shaft 22 is made not only turnable but also movable axially. In the position in which it is coupled with the cord disc 24, two spring pressed projections 30 (Figures 8 and 9) engage in a peripheral groove 31 (Figure 7) of the hollow shaft 22 and secures it in this coupled position. If the hollow shaft 22, which is provided at the other end to the coupling with a knob 32, is drawn to the right in Figure 7, until the projections 30 fall into an intermediate peripheral groove 34, then the hollow shaft 22 is uncoupled from the cord disc 24, the latter runs free when the steering rod is turned and the driver by turning the hollow shaft 22 by means of its knob 32 can now manually adjust the contact fork 21 as desired with respect to the segment ring 20 of the commutator, on which it has not lost contact by this longitudinal movement, so as to operate the electromagnets and the armature pole wheel of the lamp reflector as necessary. The turning movement of the hollow shaft 22 is in this case limited by locking ball 40 which lies in a longitudinal groove 41 of the support 42 and engages in a helical groove 43 of the hollow shaft 22. The length of this groove 42 depends on the allowable amount of turning stroke of the steering wheel on the steering rod.

The hollow shaft 22 can be drawn further out. But this can only take place when an abutment 50 fast to the hollow shaft 22 can enter a notch 51 in the commutator casing which is only possible if the hollow shaft 22 is in such a position that the vertical middle plane of the reflector is in a straight line forward. In this position of the hollow shaft 22 the abutment 50 is substantially aligned with the notch 51.

If then the hollow shaft 22 is drawn out until the projections 30 spring into the peripheral groove 54, whereby the abutment 50 is brought into the notch 51, the contact fork 21 is withdrawn from the segment ring 20 and the circuit of all electromagnets is thus broken. The lamp reflector therefore remains stationary, whilst the hollow shaft 22 is prevented from undesired rotation by the abutment 50 and is thus held in the withdrawal position.

In the knob 32 of the hollow shaft 22 is constructed an electric signal lamp 60 whose current is supplied from outside through the hollow shaft 25 and which is connected in the common auxiliary part of the circuit of the electromagnets (Figure 13). If this lamp is lit the driver knows with certainty that one or other of the electromagnets is in circuit.

For the case where for any reason the circuit should fail, a locking electromagnet 65 is provided which also lies in the common auxiliary part of the circuit of the electromagnets $7^a$, $7^b$, $7^c$, $7^d$ (Figure 13). As long as the circuit is closed the locking electromagnet 65 is excited and holds a locking projection 66 (Figure 5) on its armature out of engagement with the armature pole wheel. If the current fails the locking projection 66 is released and falls between two adjacent poles of the armature pole wheel and locks the same.

Turning the reflector 1 necessitates the lamp casing 70 being cut away on both sides in the way shown in Figures 10, 11 and 12 so as not to interfere with the laterally swivelling beam. The protecting glass 71 has to accommodate itself also to these openings. Moreover the reflector itself also has lateral openings, as shown in Figure 1.

The lamp casing is not of the usual shape. Its lower part is considerably widened so as to accommodate the electromagnets and the armature pole wheel with its associated parts, which parts are housed in a protective casing 75.

As can be seen from Figure 6 the commutator and contact mechanism is arranged on the dash board 72. Instead of the cord disc mechanism of course any other positive connection can be used between the steering rod and the commutator and contact mechanism. Also the reflector can be adjusted from the steering by means of some other control mechanism than the described electromagnetic one.

The lamp glass can be sharply curved to avoid the lateral openings. The glass of the lamp casing can be given various fantastic shapes.

It is obvious that by turning the knob 32, after the coupling has been disengaged at 23, it will also be possible to turn the light beam so as to prevent a dazzling of the conductor of a vehicle coming from the opposite direction. However in this case, the automatic adjusting operation must be uncoupled. In order to allow blinding without affecting the automatic adjusting operation, the following modification (Figures 14, 15, 16 and 17) can be provided on the manual operating device.

The hollow shaft 22 possesses a reduced portion $22^a$ upon which is engaged a sleeve 80. The wall of this sleeve has an opening 81 shown in Figures 15 and 17 and adapted to receive a locking stop 82 fixed to the reduced portion of the shaft 22. The stop 82 is arranged to enter a slot 83 in the commutator casing when the current is wholly cut out by rotation of the knob 32. The stop 82 is angularly displaced at an angle of 180° with respect to the abutment 50.

The contact fork 21 is here fixed onto the sleeve 80, instead of being fastened as before on the shaft 22 itself. The sleeve 80 carries also an auxiliary hand operatable disc 85 provided with a lateral tooth 86 engaged within a peripherically elongated notch 87 of the hub of the knob 32, this notch allowing the hand disc 85 to be turned within certain limits independently of the knob 32, the two extreme positions of the hand disc 85 being determined by a spring latch 88 fixed thereon and engaging with one or other of two arresting notches 90 provided on the hub of the knob 32.

With the coupling engaged at 23, the sleeve 80 follows the automatic adjusting movement of the shaft 22, the disc 85 having its spring latch 88 engaged with one of the arresting notches 90 in the hub of the knob 32, so that the whole constitutes an integral construction like that of the first arrangement.

When however a vehicle arrives from the opposite direction, the conductor turns by hand the disc 85 so that its tooth 86 strikes against the other end of the notch 87 and that its spring latch 88 engages the other notch 90 in the hub of the knob 32. This partial relative rotation of the disc 85 is necessarily followed by an additional deviation of the light beam beyond its adjusted position, allowing same to illuminate sufficiently the road without however dazzling the conductor of the oppositely arriving vehicle. The stop 82 then coming out of alignment with the slot 83, prevents complete rotation of the hollow shaft 22 in crossing conditions. The crossing of the vehicles having taken place, the disc 85 is returned to its normal position.

What I claim is:

1. A vehicle lamp, comprising a light source, a rotary reflector, a rotary armature wheel with a relatively great number of radial poles, connected to said reflector, a relatively small number of electromagnets in electromagnetic cooperation with said armature wheel, the number of the poles of the latter being a multiple not divisible without remainder by the number of electromagnets, an electric circuit for the excitation of the same, a commutator control device to successively insert said electromagnets in said electric circuit, connecting means between said commutator control device and the steering mechanism of the vehicle, said connecting means comprising a manually releasable coupling for disengaging said connecting means, and said commutator control device being provided with a manually operatable part for manual operation thereof when said coupling is released.

2. A vehicle lamp, comprising a light source, a rotary reflector, a rotary armature wheel having radial poles, connected to said reflector, electromagnets in electromagnetic cooperation with said armature wheel, an electric circuit for the excitation of the said electromagnets, a commutator having its segments electrically connected to the electromagnets, a rotary control contact member thereon connected in said circuit, driving means for said contact member connected to the steering mechanism of the vehicle, a coupling between said contact member and said driving means, said contact member being also axially movable for disengaging the coupling and being provided with a manually operatable part for turning the contact member by hand when said coupling is disengaged.

3. A vehicle lamp, comprising a light source, a rotary reflector, a rotary armature wheel having radial poles, connected to said reflector, electromagnets in electromagnetic cooperation with said armature wheel, an electric circuit for the excitation of the said electromagnets, a commutator having its segments electrically connected to the electromagnets, a rotary control contact member thereon connected in said circuit, driving means for rotating said contact member, connected to the steering mechanism of the vehicle, a coupling between said contact member and said driving means, said contact member being provided with a manually operatable part and being not only rotatable, but also axially movable in such a manner as to be capable of being brought into a position for disengaging the coupling and into a second position for leaving the commutator for current cutting out purposes.

4. A vehicle lamp, comprising a light source, a rotary reflector, a rotary armature wheel with a relatively great number of radial poles, connected to said reflector, a relatively small number of electromagnets in electromagnetic cooperation with said armature wheel, the number of the poles of the latter being a multiple not divisible without remainder by the number of electromagnets, an electric circuit for the excitation of the same, a commutator having its segments electrically connected to the electromagnets, a rotary control contact member thereon connected in said circuit, driving means for rotating said contact member, connected to the steering mechanism of the vehicle, a coupling between said contact member and said driving means, said contact member being provided with a manually operatable part and being not only rotatable, but also axially movable in such a manner as to be capable of being brought into a position for disengaging the coupling and into a second position for leaving the commutator for current cutting out purposes, means being provided for only allowing the movable contact member to be brought into said second position when it has a position on the commutator corresponding to the straight forward position of the reflector.

5. A vehicle lamp, comprising a light source, a rotary reflector, a rotary armature wheel with a relatively great number of radial poles, connected to said reflector, a relatively small number of electromagnets in electromagnetic cooperation with said armature wheel, the number of the poles of the latter being a multiple not divisible without remainder by the number of electromagnets, an electric circuit for the excitation of the same, a commutator control device to successively insert said electromagnets in said electric circuit, connecting means between said commutator control device and the steering mechanism of the vehicle, said connecting means comprising a manually releasable coupling for disengaging said connecting means, and said commutator control device being provided with a manually operatable part for manual operation thereof when said coupling is released, an electric signal lamp being combined with said commutator control device to visually indicate operative action thereof.

6. A vehicle lamp, comprising a light source, a rotary reflector, a rotary armature wheel having radial poles, connected to said reflector, electromagnets in electromagnetic cooperation with said armature wheel, an electric circuit for the excitation of the said electromagnets, a control device to successively insert said electromagnets in said electric circuit, said control device comprising a commutator with segments connected to said electromagnets and a movable control contact member thereon, automatic means to move said contact member on the commutator in dependence of the movements of the steering mechanism of the vehicle, the commutator segments having such a breadth with respect to the armature pole division that on an angular deviation of the steering mechanism from the straight forward position the movable contact member is allowed to pass over a commutator segment causing an advance of the movement of the armature pole wheel with respect to the steering angular deviation.

7. A vehicle lamp, comprising a light source, a rotary reflector, a rotary armature wheel with a relatively great number of radial poles, connected to said reflector, a relatively small number of electromagnets in electromagnetic cooperation with said armature wheel, the number of the poles of the latter being a multiple not divisible without remainder by the number of electromagnets, an electric circuit for the excitation of the same, a commutator control device to successively insert said electromagnets in said electric circuit, connecting means between said commutator control device and the steering mechanism of the vehicle, and electromagnetic locking means to lock the armature pole wheel on failure of current in said circuit.

8. A vehicle lamp, comprising a light source, a rotary reflector, a rotary armature wheel with a relatively great number of radial poles, connected to said reflector, a relatively small number of electromagnets in electromagnetic cooperation with said armature wheel, the number of the poles of the latter being a multiple not divisible without remainder by the number of electromagnets, an electric circuit for the excitation of the same, a commutator control device to successively insert said electromagnets in said electric circuit and connecting means between said commutator control device and the steering mechanism of the vehicle, said commutator control device being combined with a manually operatable auxiliary control system to allow the operator to act upon the commutator control device so as to cause some additional deviation of the reflector for preventing dazzling effects.

In witness whereof I have hereunto signed my name this 13th day of July, 1928.

OLIVIER ADDOR.